(12) United States Patent
Chen et al.

(10) Patent No.: US 11,188,643 B2
(45) Date of Patent: Nov. 30, 2021

(54) METHODS AND APPARATUS FOR DETECTING A SIDE CHANNEL ATTACK USING HARDWARE PERFORMANCE COUNTERS

(71) Applicant: Intel Corporation, Santa Clara, CA (US)

(72) Inventors: Li Chen, Hillsboro, OR (US);
Abhishek Basak, Hillsboro, OR (US);
Salmin Sultana, Hillsboro, OR (US);
Justin Gottschlich, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 260 days.

(21) Appl. No.: 16/234,144

(22) Filed: Dec. 27, 2018

(65) Prior Publication Data
US 2019/0130101 A1    May 2, 2019

(51) Int. Cl.
*G06F 21/55*    (2013.01)
*G06N 20/00*    (2019.01)
(Continued)

(52) U.S. Cl.
CPC ............. *G06F 21/554* (2013.01); *G06N 3/08* (2013.01); *G06N 20/00* (2019.01); *G06F 21/53* (2013.01); *G06F 2221/034* (2013.01)

(58) Field of Classification Search
CPC .. G06F 21/554; G06F 21/53; G06F 2221/034; G06N 20/00; G06N 3/08; G06N 3/0454; G06N 3/0445; G06N 3/0481
See application file for complete search history.

(56) References Cited

U.S. PATENT DOCUMENTS

| 9,904,587 B1* | 2/2018 | Potlapally ............ G06F 11/3419 |
| 2015/0373036 A1* | 12/2015 | Patne .................... G06F 21/755 |
| | | 726/23 |

(Continued)

OTHER PUBLICATIONS

Garcia-Serrano A. Anomaly detection for malware identification using hardware performance counters. arXiv preprint arXiv: 1508.07482. Aug. 29, 2015. (Year: 2015).*

(Continued)

*Primary Examiner* — Robert B Leung
(74) *Attorney, Agent, or Firm* — Hanley, Flight & Zimmerman, LLC

(57) ABSTRACT

Methods, apparatus, systems and articles of manufacture for detecting a side channel attack using hardware performance counters are disclosed. An example apparatus includes a hardware performance counter data organizer to collect a first value of a hardware performance counter at a first time and a second value of the hardware performance counter at a second time. A machine learning model processor is to apply a machine learning model to predict a third value corresponding to the second time. An error vector generator is to generate an error vector representing a difference between the second value and the third value. An error vector analyzer is to determine a probability of the error vector indicating an anomaly. An anomaly detection orchestrator is to, in response to the probability satisfying a threshold, cause the performance of a responsive action to mitigate the side channel anomaly.

30 Claims, 8 Drawing Sheets

(51) Int. Cl.
*G06N 3/08* (2006.01)
*G06F 21/53* (2013.01)

(56) References Cited

U.S. PATENT DOCUMENTS

| | | | | |
|---|---|---|---|---|
| 2016/0188876 A1* | 6/2016 | Harris | ............... | G06F 21/554 |
| | | | | 726/23 |
| 2016/0253498 A1* | 9/2016 | Valencia | ............ | G06F 21/55 |
| | | | | 726/23 |
| 2016/0328561 A1* | 11/2016 | Tamir | ................ | G06F 21/566 |
| 2018/0007074 A1* | 1/2018 | Kune | .................. | G06F 21/56 |
| 2018/0300621 A1* | 10/2018 | Shah | .................... | G06N 3/08 |
| 2019/0095300 A1* | 3/2019 | Oba | ................ | G06F 11/2257 |
| 2019/0138719 A1 | 5/2019 | Sultana et al. | | |

OTHER PUBLICATIONS

Nomani J, Szefer J. Predicting program phases and defending against side-channel attacks using hardware performance counters. In Proceedings of the Fourth Workshop on Hardware and Architectural Support for Security and Privacy Jun. 14, 2015 (pp. 1-4). (Year: 2015).*

Li C, Gaudiot JL. Online detection of spectre attacks using microarchitectural traces from performance counters. In 2018 30th International Symposium on Computer Architecture and High Performance Computing (SBAC-PAD) Sep. 24, 2018 (pp. 25-28). IEEE. (Year: 2018).*

Singh, A., 2017. Anomaly detection for temporal data using long short-term memory (lstm). (Year: 2017).*

Ott K, Mahapatra R. Hardware performance counters for embedded software anomaly detection. (DASC/PiCom/DataCom/CyberSciTech) Aug. 12, 2018 (pp. 528-535). IEEE. (Year: 2018).*

Abbas MF, Kadiyala SP, Prakash A, Srikanthan T, Aung YL. Hardware performance counters based runtime anomaly detection using SVM. In 2017 TRON Symposium (TRONSHOW) Dec. 13, 2017 (pp. 1-9). IEEE. (Year: 2017).*

Irazoqui E1 Al., "S$A: A Shared Cache Attack That Works across Cores and Defies VM Sandboxing - and Its Application to AES," [http://citeseerx.ist.psu.edu/viewdoc/download?doi=10.1.1.699.6655&rep=rep1&type=pdf], 2015 IEEE Symposium on Security and Privacy, San Jose, CA, 2015, pp. 591-604, 14 pages.

* cited by examiner

METHODS AND APPARATUS FOR DETECTING A SIDE CHANNEL ATTACK USING HARDWARE PERFORMANCE COUNTERS

FIELD OF THE DISCLOSURE

This disclosure relates generally to anomaly detection, and, more particularly, to methods and apparatus for detecting a side channel attack using hardware performance counters.

BACKGROUND

Over the past few years, micro-architectural side channel attacks have evolved from theoretical attacks on cryptographic algorithm implementations to highly practical generic attack primitives. For example, vulnerabilities such as the Meltdown and Spectre attacks exploit vulnerabilities in modern processors and break memory isolation among processes or privilege layers to gain access to data from other applications and/or the operating system (OS). Such data may include passwords stored in a password manager or browser, personal photos, emails, instant messages, and even business-critical documents. Side channel attacks exploit the fact that hardware resources are physically shared among processes running in different isolation domains.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
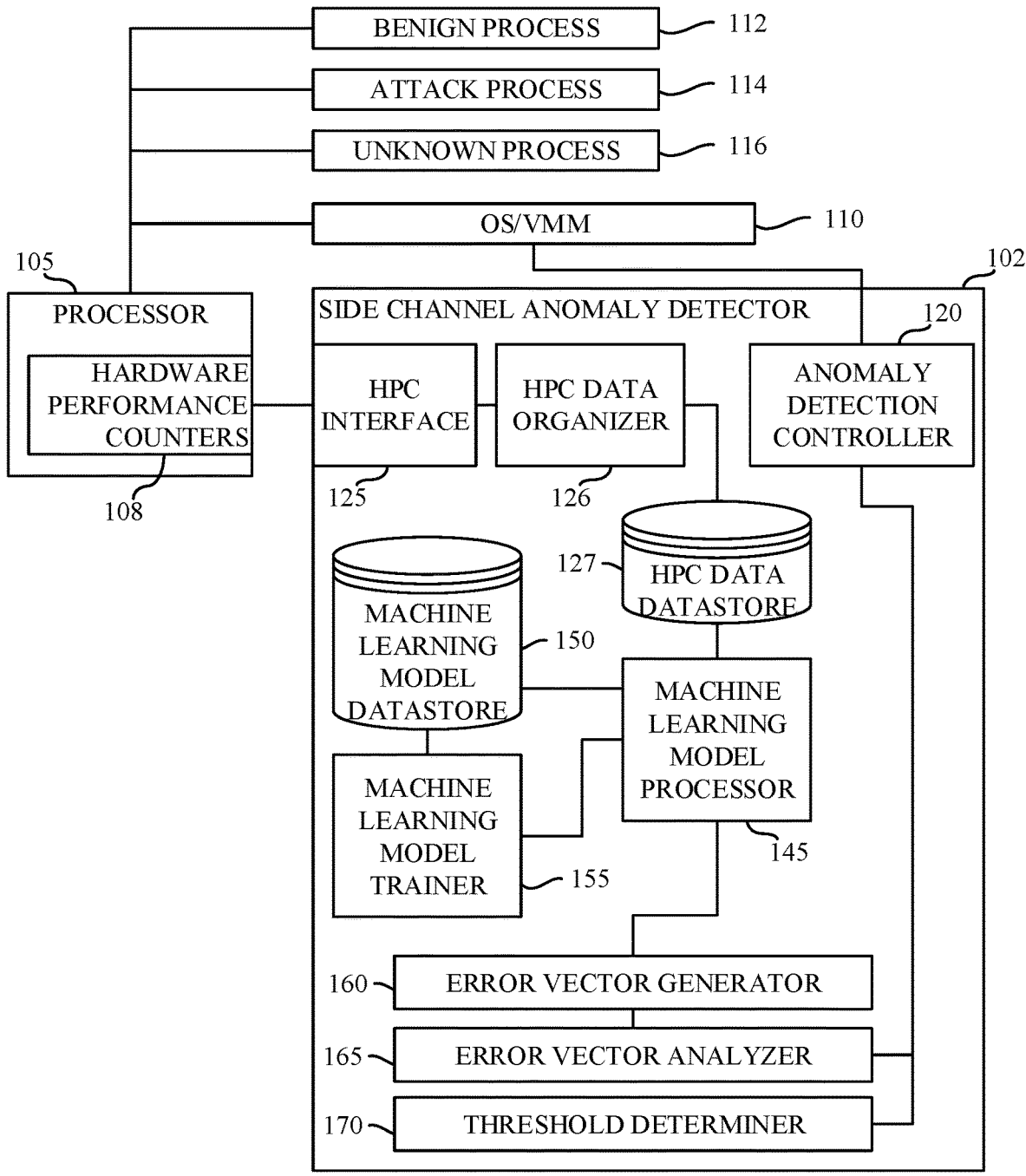
FIG. 1 is a block diagram of an example system constructed in accordance with teachings of this disclosure for detecting a side channel attack using hardware performance counters.

Side channel attacks exploit the fact that hardware resources of a computing system, such as a cache, a branch predictor, a branch target buffer, an execution unit, etc., are physically shared among processes running on the computing system. Mitigations against side channel attacks mainly focused on patching and proposing new architecture designs. However, not all systems can be patched. Even where possible, patching can be difficult. Moreover, patching sometimes introduces a large amount of operational overhead including, for example, physically replacing hardware components. Example approaches disclosed herein seek to mitigate side channel attacks by early detection of such attacks, enabling responsive actions to be taken to avoid the impact(s) of a side channel attack.

Cache Side Channel Attacks (SCA) are serious threats to information security where multiple processes/virtual machines (VMs) execute on the same physical machine (e.g., share hardware resources of the physical machine). A cache of the central processing unit (CPU) is one of the most dangerous shared resources since the CPU cache is shared by all of the cores in a CPU package. As a result, the CPU cache represents a possible attack vector to perform fine-grained, high-bandwidth, low-noise cross-core attacks.

Example approaches disclosed herein utilize a lightweight anomaly detection framework for detection of cache side channel attacks. Example approaches disclosed herein utilize a machine learning algorithm to perform time-series analysis of Hardware Performance Counter (HPC) data, and develops an anomaly detection model using stacked gated recurrent units (GRU) to detect cache side channel attacks. The stacked GRUs are built on the multivariate time-series of the hardware performance counters rather than built on a single time-series of the HPC. In examples disclosed herein, attack data is not used for training of such anomaly detection models (but may be used for determination of anomaly detection thresholds). As a result, the anomaly detection approach is generalizable to detect newly evolved unseen attacks.

The example machine-learning framework utilized herein is based on anomaly detection of time-series hardware performance counter data, and can be used for runtime detection of cache side channel attacks. The example framework utilizes four main activities: (1) collect hardware performance counters, (2) train a machine learning model, (3) determine an anomaly detection threshold, and (4) detect an anomaly in time-series data using the trained model and anomaly detection threshold. In examples disclosed herein, the machine learning model uses one-class anomaly detection, which can effectively detect attacks not seen before. As a result, the system possesses a degree of resiliency against newly evolved attacks. Moreover, example approaches disclosed herein utilize multivariate time-series processing and prediction, which does not require the use of one model per time-series of hardware performance counters. As a result, such processing can all be performed at once, instead of having to perform each separate time series using separate models.

In example approaches disclosed herein, the machine learning model is implemented as a stacked GRU. However, other types of machine learning models such as, for example, a long short-term memory (LSTM) recurrent neural network (RNN) may additionally or alternatively be used. In examples disclosed herein, a stacked GRU implementation is more resource efficient and faster than approaches that utilize an LSTM-based machine learning model. In some examples, such increased resource efficiency comes at the cost of decreased accuracy. Since the LSTM-based architecture sometimes produces higher accuracy than the GRU-based architecture, but the GRU-based architecture includes fewer gates and, as a result, can be executed more quickly. The stacked GRU-based architecture may be used to first predict a probability of observing the error being slightly above the detection threshold. Example approaches may then utilize the LSTM-based architecture for further analysis of whether an anomaly has been detected.

FIG. 1 is a block diagram of an example system constructed in accordance with teachings of this disclosure for detecting a side channel attack. In examples disclosed herein, a machine-learning based detection system is used to detect speculative and traditional cache side channel attacks based on changes in values of hardware performance counters of a computing system. The example system 100 of FIG. 1 includes a side channel anomaly detector 102, a processor 105, and an operating system/virtual machine manager (VMM) 110. The example processor 105 includes one or more hardware process counter(s) 108 that are utilized by processes executing on the processor 105. The example system 100 of the illustrated example of FIG. 1 shows a benign process 112, an attack process 114 and an unknown process 116. Such processes 112, 114, 116 may be executed at the direction of the OS/VMM 110.

The example processor 105 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In examples disclosed herein, hardware performance counter(s) 108 included in the processor 105 include one or more registers of the processor 105 that stores counts of hardware-related activities of the processor. In some examples, a set of hardware performance counters is maintained by each core of the processor. Thus, in examples where the processor 105 includes multiple cores, there may be multiple sets of hardware performance counter(s) 108. The counter(s) of the hardware performance counter(s) 108 respectively store a value corresponding to a particular type of hardware value and/or event that has occurred at the processor 105. For example, the hardware performance counter(s) 108 may include a counter to identify a number of cache misses, include a counter to identify a number of branch mis-predictions, etc. In some examples, the hardware performance counter(s) 108 offered by processor 105 may depend on the manufacturer, model, type, etc. of the processor 105.

The example OSS/VMM 110 of the illustrated example of FIG. 1 represents at least one of the operating system and/or virtual machine manager of the computing system 100. In examples disclosed herein, the OS/VMM 110 manages execution of processes by the processor 105. In some examples, the OS/VMM 110 controls isolation of the processes executed by the processor by, for example, instructing the processor to physically separate the process domains of various processes. For example, the processor 105 may, at the direction of the OS/VMM 110, physically separate (e.g., on two or more separate cores, on two or more separate CPUs, etc.) the execution space and/or memory accessible to various processes. Such separation reduces (e.g., minimizes) the shared hardware resources between the domains (process, VM, etc.) and thereby reduces (e.g., minimizes) a risk that sensitive data may be exposed.

The example benign process 112 of the illustrated example of FIG. 1 is a process that stores sensitive information (e.g., passwords, images, documents, etc.) in a cache of the processor 105. The example attack process 114 of the illustrated example of FIG. 1 is a process that seeks to perform a side channel attack to gain access to sensitive information stored by the benign process 112. In some examples, the example attack 114 is not a malicious process, in that the attack process 114 does not actually share the sensitive information outside of the computing system. An attack pattern may be simulated by such a non-malicious attack process without actually exposing any sensitive user information (e.g., passwords, images, documents, etc.). However, in some examples, the attack process 114 is a malicious process and may attempt to share the sensitive information outside of the computing system 100. In such examples, additional safeguards may be put in place to stop the actual sharing of sensitive information such as, for example, a firewall that prevents communications including the sensitive information from reaching their destination.

The example unknown process 116 of the illustrated example of FIG. 1 represents a process that is not known to be a benign process or an attack (malicious or non-malicious) process. As a result, the side channel anomaly detector 102 monitors hardware performance counter values (e.g., hardware performance counter values associated with the unknown process 116), and processes such hardware performance counter values to attempt to determine whether the unknown process 116 is performing an attack.

The example side channel anomaly detector 102 of the illustrated example of FIG. 1 includes an anomaly detection controller 120, an HPC interface 125, an HPC data organizer 126, an HPC data datastore, a machine learning model processor 145, a machine learning model datastore 150, a machine learning model trainer 155, an error vector generator 160, an error vector analyzer, and a threshold determiner 170.

The example anomaly detection controller 120 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the anomaly detection controller 120 implements means for causing performance of a responsive action to mitigate a side channel attack. The means for causing may additionally or alternatively be implemented by a processor executing, for example, blocks 370, 390, 395, 510, and/or 690 of FIGS. 3, 5, and/or 6. The example anomaly detection controller 120 controls operation of the side channel anomaly detector 102 and interfaces with the OS/VMM 110 to identify the potential occurrence of an anomalous behavior (e.g., a side channel attack). In some examples, to facilitate training, the example anomaly detector 102 interfaces with the OS/VMM 110 to instruct the OS/VMM to execute one or more of the benign process 112 and/or the attack process 114. In some examples, the anomaly detection controller 120 compares a returned probability value to a threshold value to determine whether an anomaly (e.g., an attack) has been detected.

The example HPC interface 125 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example HPC interface 125 retrieves hardware performance counter values from the hardware performance counters 108. The example HPC interface 125 provides the retrieved HPC counter values to the HPC data organizer to enable organization of the retrieved HPC data. In examples disclosed herein, retrieval of HPC values is performed at periodic monitoring intervals for a threshold amount of time (e.g., once per minute for ten minutes).

The example HPC data organizer 126 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the HPC data organizer 126 implements means for collecting a hardware performance counter value(s). The means for collecting may additionally or alternatively be implemented by a processor executing, for example, blocks 405, 410, 415, 420, 430, 450, and/or 460 of FIG. 4. The example HPC data organizer 126 identifies one or more type(s) of HPC data to be collected and a length of a time period for which such data is to be collected. In some examples, the HPC data organizer 126 identifies a frequency at which such data is to be collected (e.g., once every minute, once every ten seconds, etc.). The example HPC data organizer 126 then collects the HPC data for each HPC type. Upon completion of the HPC data collection for each of the HPC data types, the example HPC data organizer 126 analyzes the returned data to determine whether any values are missing. Data may be missing when, for example, values for a first data type are collected at a first frequency (e.g., once every minute) while values for a second data type are collected at a second frequency different from the first frequency (e.g., once every ten seconds). Data may be considered missing when, for example, a value having a first timestamp appears in connection with a first data type, but no value having the first timestamp (or a timestamp within a threshold amount of time from the first timestamp) within a second data type. If any data points are missing, the example HPC data organizer 126 imputes missing values to fill in those data points missing from the HPC data. In examples disclosed herein, the example HPC data organizer 126 imputes the missing values using, for example, average values, median values, etc. In some examples, if the time-series data is of different lengths, padding can be used to achieve equal time length.

The example HPC data datastore 127 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example HPC data datastore 127 may be in any data format such as, for example, binary data, comma delimited data, tab delimited data, structured query language (SQL) structures, etc. While, in the illustrated example, the HPC data datastore 127 is illustrated as a single device, the example HPC data datastore 127 and/or any other data storage devices described herein may be implemented by any number and/or type(s) of memories. In the illustrated example of FIG. 1, the example HPC data datastore 127 stores HPC data organized by the HPC data organizer 126. In some examples, the HPC data datastore 127 may store HPC data created by HP data organizer(s) of another side channel anomaly detector 102. That is, HPC data may be generated by one computing system and supplied to another computing system to facilitate operation thereof. In examples disclosed herein, HPC data in the HPC data datastore 127 is labeled according to whether the HPC data represents benign activity, attack activity, and/or other types of activities.

The example machine learning model processor 145 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the machine learning model processor 145 implements means for predicting a value using a machine learning model. The means for predicting may additionally or alternatively be implemented by a processor executing, for example, blocks 530, 610, 670, and/or 710 of FIGS. 5, 6, and/or 7. The example machine learning model processor 145 implements a machine learning model (e.g., a neural network) according to the model information stored in the model datastore 150. The example machine learning model implements one or more stacked GRU(s). However, any other past, present, and/or future machine learning topology(ies) and/or architecture(s) may additionally or alternatively be used such as, for example, deep neural network (DNN), a convolutional neural network (CNN), a feed-forward neural network, a long short-term memory (LSTM) recurrent neural network (RNN).

The example machine learning model datastore 150 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example model data store 150 may be in any data format such as, for example, binary data, comma delimited data, tab delimited data, structured query language (SQL) structures, etc. While, in the illustrated example, the model data store 150 is illustrated as a single device, the example model data store 150 and/or any other data storage devices described herein may be implemented by any number and/or type(s) of memories. In the illustrated example of FIG. 1, the example model data store 150 stores machine learning models trained by the machine learning model trainer 155. In some examples, the model(s) stored in the example model data store 150 may be retrieved from another computing system (e.g., a server that provides the model(s) to the side channel anomaly detector 102).

The example machine learning model trainer 155 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the example machine learning model trainer 155 implements means for training a machine learning model. The means for training may additionally or alternatively be implemented by a processor executing, for example, block 520 of FIG. 5. The example machine learning model trainer 155 performs training of the model stored in the model data store 150. In examples disclosed herein, training is performed using Stochastic Gradient Descent. However, any other approach to training a machine learning model may additionally or alternatively be used.

The example error vector generator 160 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the error vector generator 160 implements means for generating an error vector. The means for generating may additionally or alternatively be implemented by a processor executing, for example, blocks 560, 615, 635, 675, and/or 720 of FIGS. 5, 6, and/or 7. The example error vector generator 160 generates an error vector $e_t$. The error vector $e_t$ represents a difference between the predicted time-series HPC data and actual time-series HPC data. In examples disclosed herein, the error vector $e_t$ is calculated using the following equation:

$$e_t = (e_{11}, \ldots, e_{1t}) = |\text{predicted}(x) - \text{actual}(x)| \qquad \text{Equation 1}$$

However, any other approach to computing an error vector may additionally or alternatively be used.

The example error vector analyzer 165 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the example error vector analyzer 165 implements means for determining a probability. The means for determining may additionally or alternatively be implemented by a processor executing, for example, blocks 570, 620, 640, 680, and/or 730 of FIGS. 5, 6, and/or 7. The example error vector analyzer 165 creates an error model representing the error vector $e_t$. In examples disclosed herein, the error vector is modeled as a multivariate Gaussian distribution parameterized by $N(\mu, \Sigma)$. In examples disclosed herein, the error model parameters are determined by the error vector analyzer 165 using a multivariate Gaussian distribution via maximum likelihood estimation (MLE). However, any other approach to selecting the error model parameters may additionally or alternatively be used. The parameter $\mu$ represents a d-dimensional mean, and the parameter $\Sigma$ represents a covariance matrix. Such parameters can later be used to determine a probability of observing a particular error vector. That is, using a later-computed error vector and the error model parameters, the example error vector analyzer 165 can generate a probability of whether an anomaly (e.g., an attack) has been detected.

The example threshold determiner 170 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the threshold determiner 170 implements means for selecting. The means for selecting may additionally or alternatively be implemented by any of the structure identified above for implementing the example threshold determiner 170. The example threshold determiner 170 selects a threshold $\tau$ that is used to determine whether the probability value computed by the error vector analyzer 165 represents an anomaly or not. In examples disclosed herein, the threshold determiner 170 selects the threshold based on a first probability associated with benign HPC data and a second probability associated with attack HPC data to reduce false positives and false negatives. In examples disclosed herein, the threshold is selected such that it is intermediate the first probability and the second probability (e.g., the mean of the first probability and the second probability). However, any other approach for selecting the threshold may additionally or alternatively be used.

Figure 2:
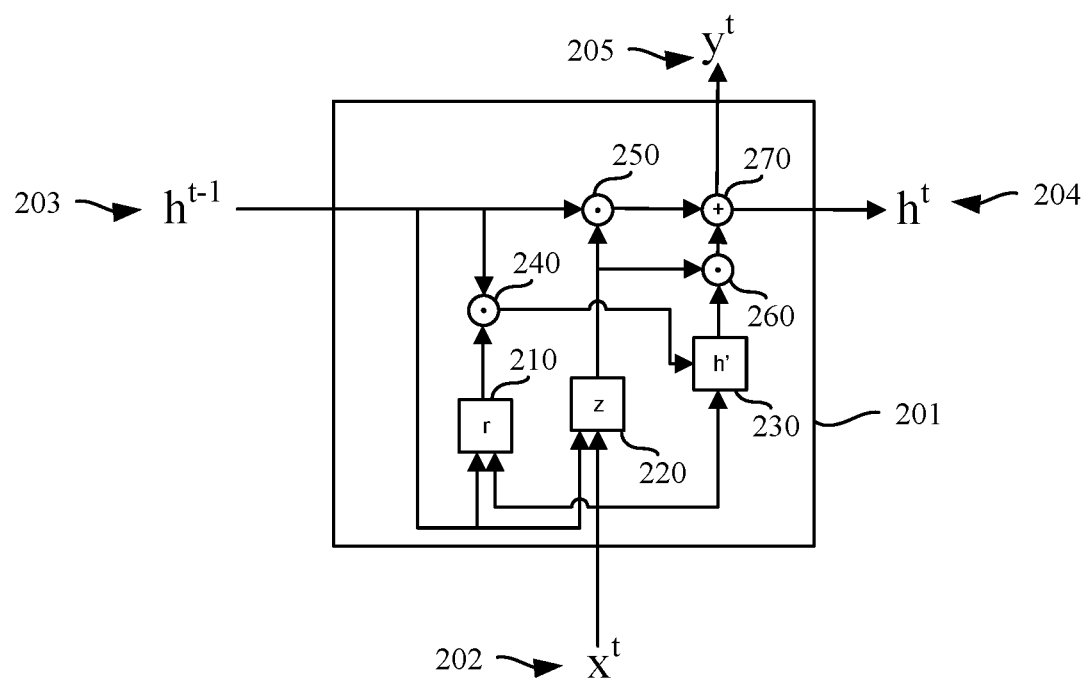
FIG. 2 is a block diagram of an example Gated Recurrent Unit used to detect a side channel attack.

FIG. 2 is a block diagram of an example Gated Recurrent Unit (GRU) 201 used to detect a side channel attack. The example GRU 201 of FIG. 2 accepts inputs $x^t$ 201 and $h^{t-1}$ 202, and outputs $h^t$ 204 and $y^t$ 205. The input $x^t$ 201 represents the current state (e.g., a value from the HPC data), and $h^{t-1}$ 203 represents a hidden state extracted from a previous cell (e.g., another GRU in a multi-GRU stack). The example GRU 201 includes a r function 210 (e.g., a reset gate vector), a z function 220 (e.g., an update gate vector), and an ht function 230. The example GRU includes a first Hadamard product function 240, a second Hadamard product function 250, a third Hadamard product function 260, and a pairwise matrix addition function 270. For the GRU 201, assuming the input at time t is $x_t$, then the following equations hold:

$$z = \sigma\left(W^z \frac{x^t}{h^{t-1}}\right) \qquad \text{Equation 2}$$

$$r = \sigma\left(W^r \frac{x^t}{h^{t-1}}\right)$$

$$h^t = z \odot h^{t-1} + (1-z) \odot h')$$

In equation 2, $h^t$ represents the hidden state. In equation 2, $z \odot h^{t-1}$ represents the forgetting of hidden state information, while $(1-z) \odot h'$ represents the remembrance of information from current nodes. In equation 2, Wz and Wr represent weighting values that are selected via training. Thus, $h^t$ forgets some information from previous $h^{t-1}$ state and includes information from current node. While in the illustrated example of FIG. 2 a single GRU is shown, multiple GRUs may be stacked together to provide a corresponding number of forward-looking predicted values. In such an example stacking architecture, hidden values are passed from one GRU to the next. That is, the output $h^t$ of a first GRU is used as the input $h^{t-1}$ of a second GRU. In examples disclosed herein, the stacked GRUs are connected via a fully connected hidden layer through feedforward connections.

While an example manner of implementing the side channel anomaly detector 102 is illustrated in FIG. 1, one or more of the elements, processes and/or devices illustrated in FIG. 1 may be combined, divided, re-arranged, omitted, eliminated and/or implemented in any other way. Further, the example anomaly detection controller 120, the example HPC interface 125, the example HPC data organizer 126, the example machine learning model processor 145, the example machine learning model trainer 155, the example error vector generator 160, the example error vector analyzer 165, the example threshold determiner 170, and/or, more generally, the example side channel anomaly detector 102 of FIG. 1 may be implemented by hardware, software, firmware and/or any combination of hardware, software and/or firmware. Thus, for example, any of the example anomaly detection controller 120, the example HPC interface 125, the example HPC data organizer 126, the example machine learning model processor 145, the example machine learning model trainer 155, the example error vector generator 160, the example error vector analyzer 165, the example threshold determiner 170, and/or, more generally, the example side channel anomaly detector 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example anomaly detection controller 120, the example HPC interface 125, the example HPC data organizer 126, the example machine learning model processor 145, the example machine learning model trainer 155, the example error vector generator 160, the example error vector analyzer 165, the example threshold determiner 170, and/or, more generally, the example side channel anomaly detector 102 of FIG. 1 is/are hereby expressly defined to include a non-transitory computer readable storage device or storage disk such as a memory, a digital versatile disk (DVD), a Blu-ray disk, etc. including the software and/or firmware. Further still, the example side channel anomaly detector 102 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowchart representative of example hardware logic, machine readable instructions, hardware implemented state machines, and/or any combination thereof for implementing the example side channel anomaly detector 102 of FIG. 1 are shown in FIGS. 3, 4, 5, 6, and/or 7. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart(s) illustrated in FIGS. 3, 4, 5, 6, and/or 7, many other methods of implementing the example side channel anomaly detector 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3, 4, 5, 6, and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
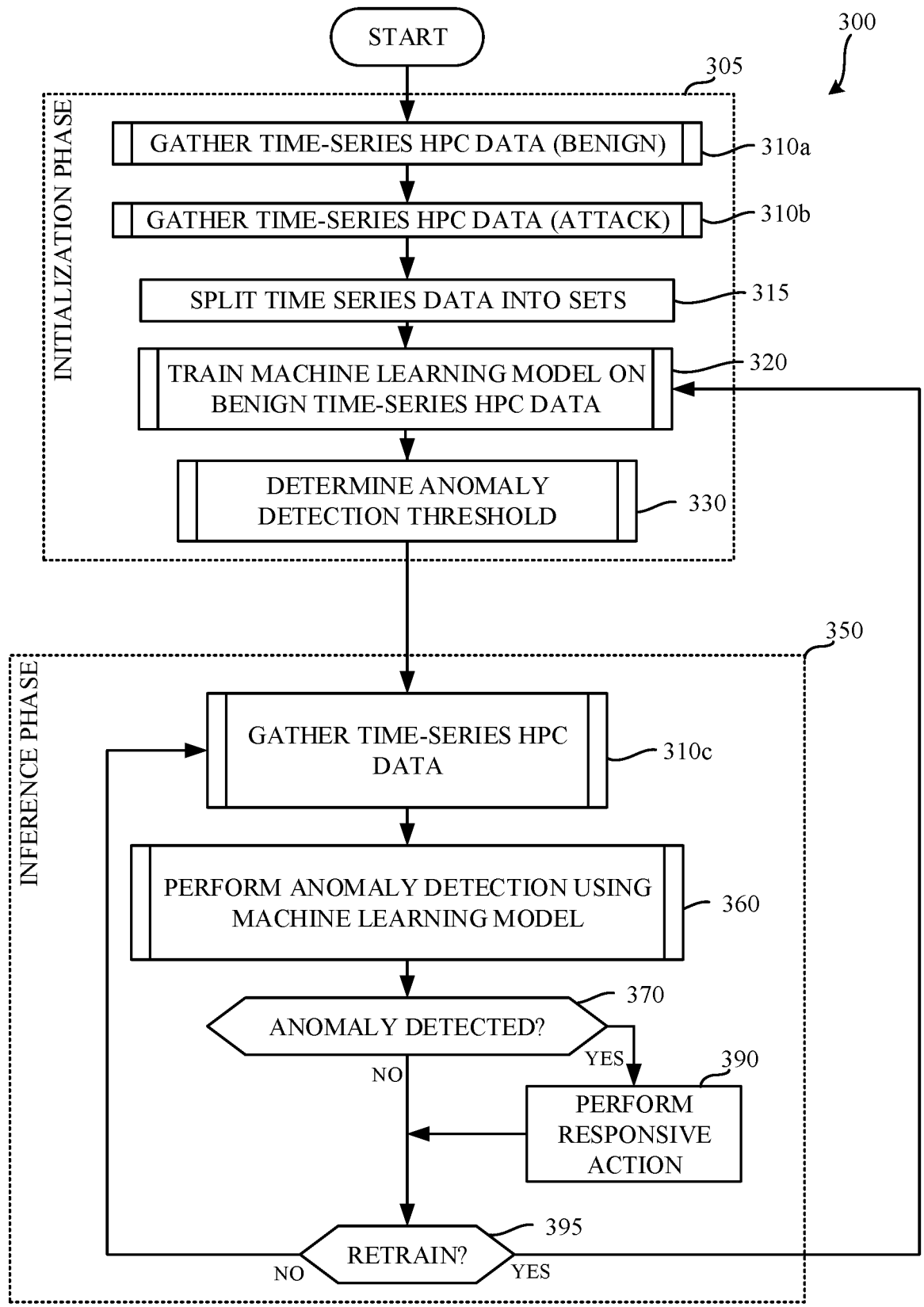
FIG. 3 is a flowchart representative of example machine readable instructions which may be executed to implement the example side channel anomaly detector of FIG. 1.

FIG. 3 is a flowchart representative of example machine readable instructions which may be executed to implement the example side channel anomaly detector 102 of FIG. 1. The example process 300 of FIG. 3 includes an initialization phase 305 and an inference phase 350. The example process 300 of FIG. 3 begins when the anomaly detection controller 120 is initialized. Such initialization may occur, for example, upon startup of the example computing system 100 of FIG. 1, at the direction of a user, etc. The example anomaly detection controller 120 enters the training phase 305, where the example anomaly detection controller 120 gathers time-series HPC data for benign activity. (Block 310a). That is, time-series HPC data is collected while an attack is not being performed. In some examples, prior to collecting the benign HPC data, the example anomaly detection controller 120 causes the OS/VMM 110 to execute the benign process 112, and causes the execution of the benign process 112 to be terminated upon completion of the collection of the HPC data. An example process for collecting the time-series HPC data is described below in connection with FIG. 4. The time-series HPC data for benign operation is stored in the HPC data datastore 127.

The example anomaly detection controller 120 gathers time-series HPC data for attack activity. (Block 310b). That is, time-series HPC data is collected while an attack is being performed (e.g., by running a non-malicious attack process 114). For example, prior to collecting the attack HPC data, the example anomaly detection controller 120 causes the OS/VMM 110 to execute the attack process 114, and causes the execution of the attack process 114 to be terminated upon completion of the collection of the attack HPC data. In some examples, an attack process 114 is executed to simulate an attack (e.g., a side channel attack). In such an example, the attack process 114 is not a malicious process, in that the attack process 114 does not actually share the sensitive information outside of the computing system. In this manner, the attack may be simulated without actually exposing any sensitive user information (e.g., passwords, images, documents, etc.). However, in some examples, the example attack process 114 may be a malicious process and may attempt to share the sensitive information outside of the computing system 100. In such examples, additional safeguards may be put in place to prevent the actual sharing of sensitive information such as, for example, a firewall that prevents communications including the sensitive information from reaching their destination.

In some examples, instead of collecting the time-series HPC data for an attack, prior time-series HPC data may be gathered (e.g., time-series HPC data identified in connection with a prior attack). Such prior time-series HPC attack data may be retrieved from, for example, the HPC data datastore 127, from an external resource (e.g., a remote side channel anomaly detector), etc. In examples disclosed herein, the time-series HPC data for the attack is not used for training the machine learning model but is, instead, used for selecting anomaly detection thresholds (e.g., to reduce the number of false positives). That is, a machine learning model is trained without utilizing attack time-series HPC data. As a result, anomaly detection may be performed without use of the attack HPC data. In such an example, detection of an anomaly may use a threshold (e.g., a pre-determined threshold) which, in some examples, may be more prone to false positive and/or false negatives than an anomaly detection threshold based on time-series attack HPC data.

In examples disclosed herein, the benign HPCs are considered to be normal operation. During training, collected time-series HPC data (e.g., the benign HPC data and the attack HPC data) are split into smaller data sets. (Block 315). The benign HPCs of the illustrated example are split into four sets including a benign training set, two benign validation sets, and one benign test set. The attack HPCs of the illustrated example are divided into two sets, including an attack validation set and an attack test set. However, the time-series HPC data may be split into any number of smaller data sets for training and/or validation purposes. As noted above, the attack data is not used for training of the machine learning model, but is instead used for determination of an anomaly detection threshold.

The example side channel anomaly detector 102 trains a machine learning model using the benign time-series HPC data. (Block 320). The trained model is stored in the machine learning model datastore 150 for future use. An example process for training the machine learning model and the anomaly detection thresholds is described below in connection with the illustrated example of FIG. 5. In this example, a machine learning model implemented using a stacked gated recurrent unit (GRU) is trained to create predictions of forward-looking HPC counter values. Those predictions are used to calculate an error vector representing deviations in the predicted values from the actual values (e.g., actual values included in the time-series HPC data). The error vector is then used to determine parameters including, for example, a d-dimensional mean and a covariance matrix. Such parameters are used to determine subsequent probabilities of observing a particular error vector.

The example side channel anomaly detector 102 determines an anomaly detection threshold $\tau$. (Block 330). In examples disclosed herein, the anomaly detection threshold represents a threshold probability that collected HPC data represents benign data. An example process for determining the anomaly detection threshold is described below in connection with the illustrated example of FIG. 6. In this example, one or more of the benign data sets (e.g., the first benign validation data set, the second benign validation data set, the benign test set, etc.) and the attack validation set are used to determine a value for the anomaly detection threshold that reduces a number of false positives in the benign test set. In some examples, the attack test set is used to determine a false positive rate.

Once training is complete, the example side channel anomaly detector 102 enters the operational phase 350. The example side channel anomaly detector 102 gathers time-series HPC data. (Block 310c). The gathered time-series HPC data represents live operations of the computing system and can be used in connection with the trained machine learning model and determined anomaly detection threshold to determine whether an anomaly is detected. The example side channel anomaly detector 102 performs anomaly detection using the trained machine learning model and, using a result of the machine learning model, determines a probability (referred to herein as a p-value) of the time-series HPC data being benign. (Block 360). An example approach to performing such anomaly detection is described in further detail in connection with FIG. 7, below. The example p-value produced by the side channel anomaly detector 102 represents a similarity of the collected time-series HPC data and benign time-series HPC data that can be used to determine if the collected HPC data is more similar to an attack operation or benign operation. In examples disclosed herein, p-values and their corresponding thresholds are created on a scale of zero to one. However, any other scale or nomenclature for representing a similarity may additionally or alternatively be used.

Using the returned probability value, the example anomaly detection controller 120 determines whether an anomaly has been detected. (Block 370). In examples disclosed herein, the anomaly is detected when the p-value is less than the anomaly detection threshold $\tau$. In response to the detection of the anomaly signifying potential onset or incidence of a cache side channel attack, (block 370 returning a result of YES), the example anomaly detection controller 120 implements one or more responsive actions (e.g., error handling techniques) to further analyze and/or mitigate such side channel attacks. (Block 390).

For example, the anomaly detection controller 120 may inform the corresponding system software (OS/VMM) 110 of the detected anomaly through available inter-process communication and/or other communication approaches (e.g., flags, interrupts, etc.). In some examples, additional information such as, for example, attacker and/or victim domain identifiers (e.g., process identifiers and/or virtual machine identifiers of the process suspected to be under attack, process identifiers and/or virtual machine identifiers of the process suspected to be performing an attack) are identified in the HPC data and, as such, the OS/VMM 110 is notified of that information as well. In some examples, such information is obtained by a runtime environment and/or scheduler of the OS/VMM 110. Such information enables the domains (e.g., an attack domain and a victim domain) to be physically separated (e.g., on two separate cores, on two separate CPUs) by the scheduler of the OS/VMM 110. Such separation reduces (e.g., minimizes) the shared hardware resources between the two domains (process, VM, etc.) and thereby reduces (e.g., minimizes) a risk that sensitive data may be exposed.

In some examples, the anomaly detection controller 120 informs the OSS/VMM 110 about potential onset of the side channel attack. The OS/VMM 110 can enable one or more architectural feature(s) that defend against cache side channel attacks. Such architectural features may be disabled by default to avoid performance costs, but may be enabled in situations where the potential onset of such an attack is detected. Such architectural features may include, for example, cache partitioning through cache allocation technology in a last level cache (LLC) of that CPU, activating memory tagging based capabilities for Level 1-Instruction (L1-I) and/or Level 1-Data (L1-D) caches, limiting speculation of memory accesses across domains, activating flushing of at least the L1-I/D caches across context switches, etc.

In some examples, the performance of the responsive action involves further analysis to determine whether a side channel attack (or a particular phase thereof) is being performed. That is, the detection/identification disclosed above in connection with FIG. 3 may be used as a first level of screening. For example, more resource-intensive analysis of the histogram(s), statistics of the histogram(s), etc. may additionally be performed. For example, further processing of the time-series HPC data may be performed using more computationally intensive techniques such as, for example, using a machine learning model implemented using a long short-term memory (LSTM) recurrent neural network (RNN). As such, further responsive actions may be performed based on a result of the more computationally intensive techniques. In some examples, the potential attacker process is sandboxed (through methods guaranteed to be side channel attack safe) by the OS/VMM 110 and more extensive monitoring is applied to the activities performed by the process such as, for example, trace-based profiling, dynamic binary-instrumentation based checks, etc.

Returning to block 370, if the example anomaly detection controller 120 determines that no anomaly is detected, the example anomaly detection controller 120 determines whether any re-training is to occur. (Block 395). In some examples, such re-training may occur in parallel with ongoing monitoring. That is, training may occur in an online fashion. In some examples, regularization is imposed to penalize false positives through, for example, a feedback loop. For example, as the anomaly detection controller 120 produces anomaly predictions, subsequent training can be performed using information identifying whether the detected anomaly was truly an anomaly. For example, after a threshold number of false positives are detected (e.g., block 395 returns a result of YES), further training may be performed (e.g., control may return to block 320 for further training utilizing additional information concerning the false positives). In effect, such further training serves to reduce the number of false positives. In addition, false negatives may also be reduced. If no retraining is to be performed (e.g., block 395 returns a result of NO), control proceeds to block 310c, where further monitoring is performed.

While in the illustrated example of FIG. 3, a single threshold is used to determine whether an anomaly has been detected, in some examples, multiple thresholds may be used. For example, if the p-value is less than or equal to a first threshold (e.g., indicating an anomaly), a responsive action may be performed; if the p-value is greater than the first threshold and less than or equal to a second threshold (e.g., indicating a potential anomaly), further analysis may be performed (and a responsive action may be performed if the further analysis identifies that an anomaly has actually occurred); and finally, if the p-value is greater than the second threshold (e.g., indicating no anomaly), no action is taken.

Figure 4:
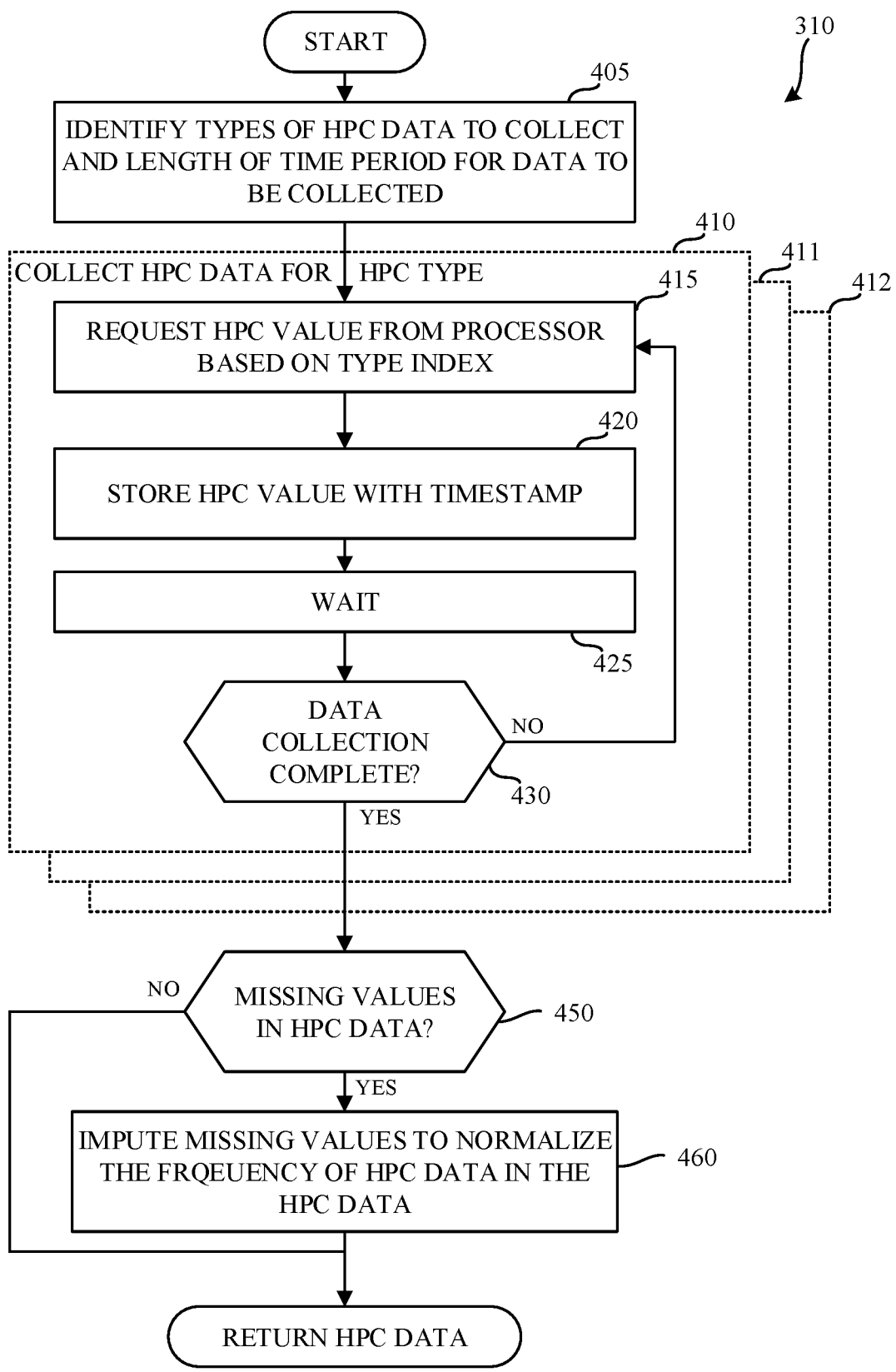
FIG. 4 is a flowchart representative of example machine readable instructions which may be executed to implement the example side channel anomaly detector of FIG. 1 to gather time-series Hardware Performance Counter (HPC) data.

FIG. 4 is a flowchart representative of example machine readable instructions which may be executed to implement the example side channel anomaly detector of FIG. 1 to gather time-series Hardware Performance Counter (HPC) data. In examples disclosed herein, the collection of the time-series HPC is considered a D-dimensional tensor (a tensor as used herein is defined to be a multi-dimensional array), where D is the number of HPCs to be collected. Each HPC produces a data matrix of size $M^{n \times d}$, where n is the number of time-series samples, and d is the number of values collected during the time period. Take, for example, a cache miss value. If ten benign workloads were executed independently for five times, and a spectre-kernel-read attack were executed for twenty independent times, then there would be seventy time-series samples (10×5+1× 20=70) to be collected. Further, suppose that each cache-miss value were sampled at 500 millisecond frequency for ten minutes (e.g., twelve hundred samples), the resultant matrix would include eighty four thousand cache miss data values. In operation it is expected that many other types of HPC values may additionally be collected. In some examples, such HPC values are sampled at different rates. If the time-series are sampled at different frequencies, example approaches disclosed herein impute missing values using for example, average values, median values, etc. In some examples, if the time-series data is of different lengths, padding can be used to achieve equal time length.

The example process of FIG. 4 begins when the example HPC data organizer 126 identifies types of HPC data to be collected, and a length of a time period for which such data is to be collected. (Block 405). In some examples, the HPC data organizer 126 identifies a frequency at which such data is to be collected. The example HPC data organizer 126 then collects the HPC data for each HPC type at the corresponding rate. (Block 410). In the illustrated example of FIG. 4, the example HPC data organizer 126 collects HPC data for different types of HPC data in parallel (represented by blocks 411 and 412). However, in some examples, the collection of the HPC data for the other types of HPC data may be performed serially. To collect the HPC data, the example HPC data organizer 126 requests the HPC value from the processor using a type index (e.g., an index identifying the type of data to be retrieved) via the HPC interface 125. (Block 415). The example HPC data organizer 126 adds a timestamp to the retrieved HPC data and stores the retrieved HPC data (and timestamp) in the example HPC data organizer 126. (Block 420). In some examples, the timestamp value may be omitted.

The example HPC data organizer 126 then waits an amount of time according to the rate at which the HPC data is to be collected. (Block 425). The example HPC data organizer 126 determines whether collection of the HPC data is complete. (Block 430). The example HPC data organizer 126 may determine that collection of the HPC data is complete when the length of time to collect HPC data has elapsed (e.g., from the execution of the first iteration of block 415). In some examples, the data collection is considered complete when a threshold number of samples (e.g., a number of samples based on the length of time to collect HPC data and the sampling frequency) has been reached. If data collection is not complete (e.g., block 430 returns a result of NO), control returns to block 415, where the process of blocks 415 through 430 is repeated until block 430 determines that data collection is complete.

Upon completion of the collection of the HPC data for each of the HPC data types (e.g., upon completion of blocks 410, 411, 412, etc.) the example HPC data organizer 126 analyzes the returned data to determine whether any values are missing. (Block 450). Data may be missing when, for example, values for a first data type are collected at a first frequency while values for a second data type are collected at a second frequency different from the first frequency. Data may be considered missing when, for example, a value having a first timestamp appears in connection with a first data type, but no value having the first timestamp (or a timestamp within a threshold amount of time from the first timestamp) is present within a second data type. If any data points are missing, the example HPC data organizer 126 imputes missing values to fill in those data points missing from the HPC data. (Block 460). In examples disclosed herein, the example HPC data organizer 126 imputes the missing values using for example, average values, median values, etc. In some examples, if the time-series data is of different lengths, padding can be used to achieve equal time length. Upon completion of the missing value imputation (block 460), or upon determination that there are no missing values in the HPC data (e.g., block 450 returning a result of NO), the example process of FIG. 4 terminates. The example process 310 of FIG. 4 may be re-executed in response to, for example, a request to collect further HPC data.

Figure 5:
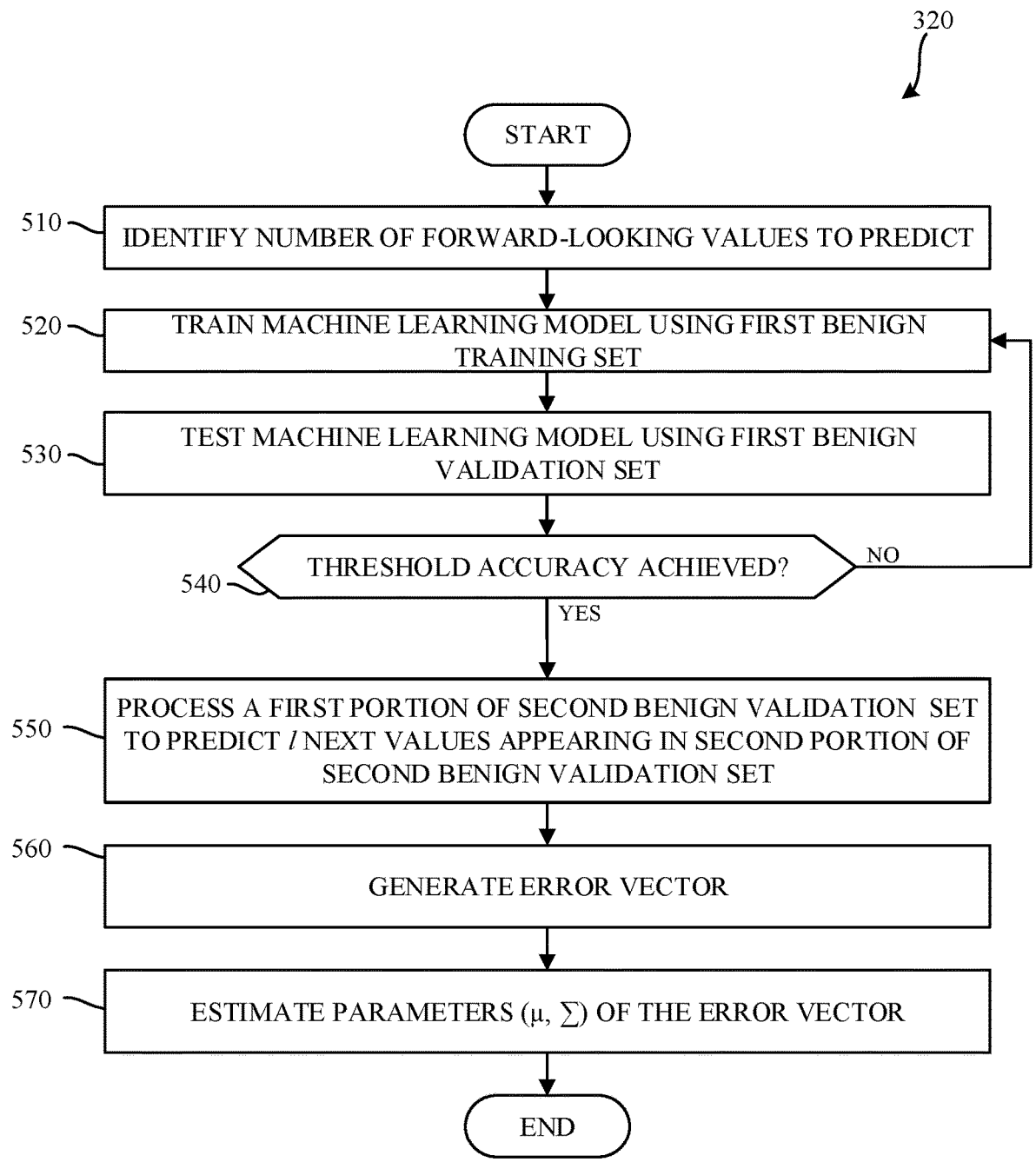
FIG. 5 is a flowchart representative of example machine readable instructions which may be executed to implement the example side channel anomaly detector of FIG. 1 to train a machine learning model on time-series HPC data.

FIG. 5 is a flowchart representative of example machine readable instructions which may be executed to implement the example side channel anomaly detector of FIG. 1 to train a machine learning model on time-series HPC data. The example process 320 of FIG. 5 begins when the example anomaly detection controller 120 identifies a number of forward-looking values to be predicted by the trained machine learning model. (Block 510).

The example machine learning model trainer 155, in connection with the example machine learning model processor 145, trains one or more models based on the benign training set to produce the identified number of forward-looking values. (Block 520). In examples disclosed herein, the machine learning model is implemented using stacked gated recurrent units (GRUs). Stacked GRUs capture the structure of time-series data (e.g., time-series HPC data). Given a time-series $X=\{x_1, x_2, \ldots, x_n\}$, where each $x_i$ is a value of the HPC at a specific sampling time, the stacked GRU is trained to predict the next l forward-looking values of HPCs.

While stacked GRUs are used in the examples disclosed herein, any other type of machine learning model may additionally or alternatively be used such as, for example, a recurrent neural network (RNN), a long short-term memory (LSTM) neural network, etc. During training, the example machine learning model trainer 155 updates the model(s) stored in the model datastore 150 to reduce an amount of error generated by the example machine learning model processor 145 when using input HPC data to attempt to predict the number of forward-looking values. In examples disclosed herein, training is performed using Stochastic Gradient Descent. However, any other approach to training a machine learning model may additionally or alternatively be used.

The example machine learning model processor 145 tests the machine learning model using the first benign validation set (e.g., the first benign validation set created at block 315). (Block 530). To perform the testing, the final l values are omitted form the first benign validation set and are used to determine whether the machine learning model processor 145 properly predicted the final l values. The example machine learning model trainer 155 calculates an accuracy between the predicted l values and the actual l values (e.g., the values omitted from the first benign validation set). The example machine learning model trainer 155 compares the calculated accuracy to an accuracy threshold. (Block 540). If the threshold accuracy is not satisfied (e.g., the calculated accuracy does not meet the accuracy threshold, block 540 returns a result of NO), control returns to block 520 where further training is performed. If the threshold accuracy is satisfied (e.g., the calculated accuracy is greater than or equal to the accuracy threshold, block 540 returns a result of YES), the example machine learning model processor 145, using the model trained at block 520, processes a first portion of the second benign validation set data to predict l next values appearing in a second portion of the second benign validation set. (Block 550). The example error vector generator 160 generates an error vector $e_t$. (Block 560). The error vector $e_t$ represents the difference between the predicted time-series HPC data and the second portion of the captured time-series HPC data. In examples disclosed herein, the error vector $e_t$ is calculated using the following equation:

$$e_t=(e_{1l}, \ldots, e_{1l})=|\text{predicted}(x)-\text{actual}(x)| \quad \text{Equation 3}$$

The example error vector analyzer 165 then creates an error model representing the error vector $e_t$. (Block 570). In examples disclosed herein, the error vector is modeled as a multivariate Gaussian distribution parameterized by $N(\mu,\Sigma)$. In examples disclosed herein, the error model parameters are determined using a multivariate Gaussian distribution via maximum likelihood estimation (MLE). However, any other approach to selecting the error model parameters may additionally or alternatively be used. The parameter $\mu$ represents a d-dimensional mean, and the parameter $\Sigma$ represents a covariance matrix. Such parameters can later be used to determine a probability of observing a particular error vector (e.g., during the testing described below in connection with FIG. 7).

The example process 320 of FIG. 5 then terminates. At this point, monitoring and detection described in connection with the inference phase 350 of FIG. 3 can be performed (e.g., without having determined the anomaly detection threshold in connection with block 330 of FIG. 3). Such processing would produce a probability of observing an error, which is compared against an error threshold. However, at this point the anomaly detection threshold has not yet been determined. As noted above in connection with block 330 of FIG. 3, the example threshold determiner 170 determines an anomaly detection threshold that can be used in connection with returned probability values to determine whether an anomaly has been detected.

Figure 6:
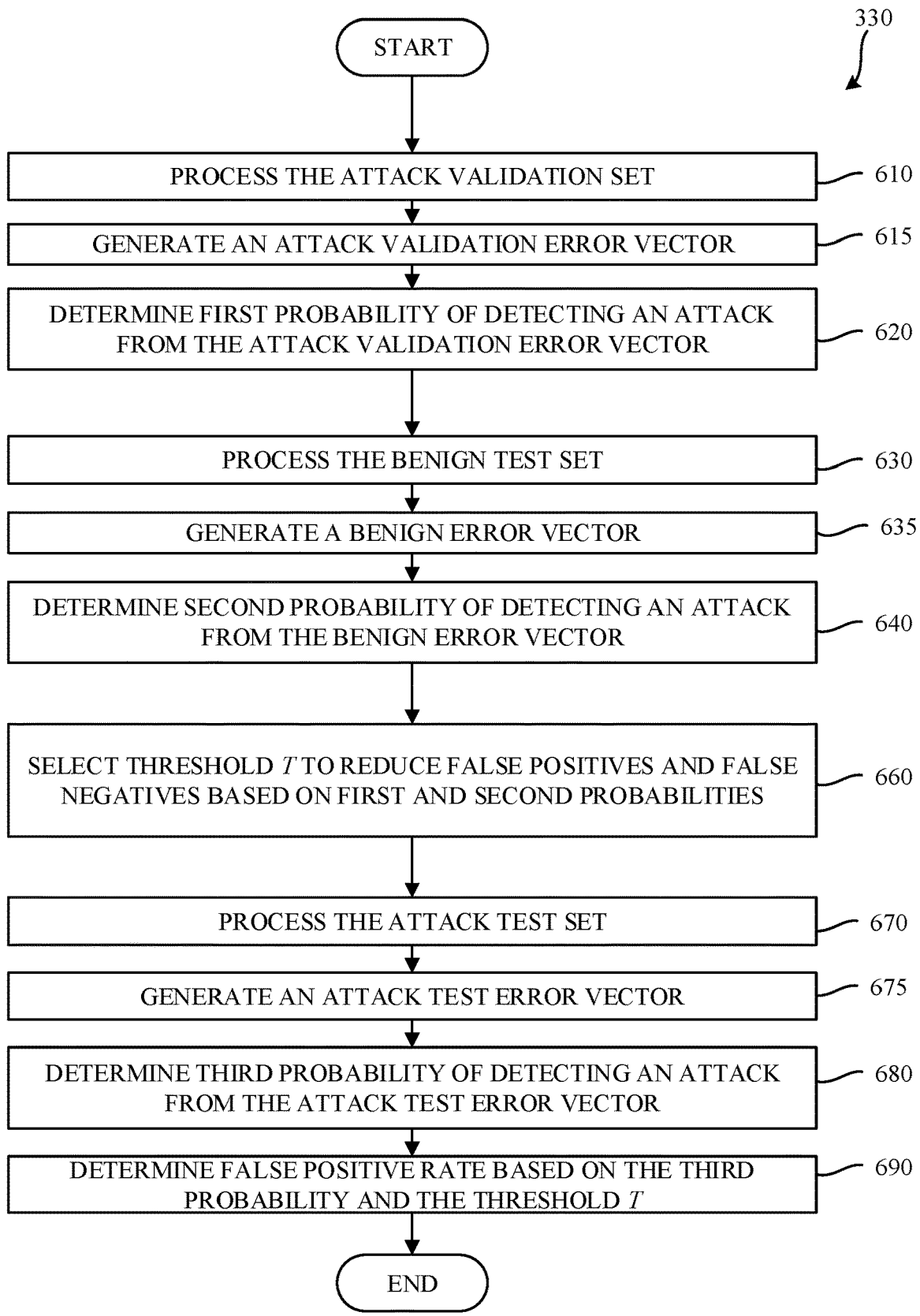
FIG. 6 is a flowchart representative of example machine readable instructions which may be executed to implement the example side channel anomaly detector of FIG. 1 to determine an anomaly detection threshold.

FIG. 6 is a flowchart representative of example machine readable instructions which may be executed to implement the example side channel anomaly detector 102 of FIG. 1 to determine an anomaly detection threshold. In examples disclosed herein, the processing of FIG. 6 utilizes the attack validation set, the benign test set, and the attack test set determined in connection with block 315 of FIG. 3. The example process 330 of FIG. 6 begins when the example machine learning model processor 145 processes a first portion of the attack validation set using the trained machine learning model (e.g., the model trained at block 520) to generate a forward-looking prediction. (Block 610). The error vector generator 160 compares the forward-looking prediction to a second portion of the attack validation set to generate an attack validation error vector. (Block 615). Using the attack validation error vector and the error model parameters $N(\mu,\Sigma)$ determined in connection with block 570 of FIG. 5, the example error vector analyzer 165 calculates a first probability of detecting an anomaly (e.g., an attack). (Block 620).

The example machine learning model processor 145 processes a first portion of the benign test set using the trained machine learning model (e.g., the model trained at block 520) to generate a forward-looking prediction. (Block 630). The error vector generator 160 then compares the forward-looking prediction to a second portion of the benign test set to generate a benign error vector. (Block 635). Using the benign error vector and the error model parameters $N(\mu,\Sigma)$ determined in connection with block 570 of FIG. 5, the example error vector analyzer 165 calculates a second probability of detecting an anomaly (e.g., an attack). (Block 640). In examples disclosed herein, the first probability (based on the attack validation set) is expected to be less than the second probability (based on the benign test set).

The example threshold determiner 170 selects a threshold $\tau$ based on the first probability and the second probability to reduce false positives and false negatives. (Block 660). In examples disclosed herein, the threshold is selected such that it is intermediate the first probability and the second probability (e.g., the mean of the first probability and the second probability). However, any other approach for selecting the threshold may additionally or alternatively be used. In the illustrated example of FIG. 6, the process 330 continues to determine a false positive rate (block 670 through 690). However, in some examples, the process 330 of FIG. 6 terminates after selection of the threshold $\tau$.

To determine the false positive rate, the example machine learning model processor 145 processes a first portion of the attack test set using the trained machine learning model (e.g., the model trained at block 520) to generate a forward-looking prediction. (Block 670). The example error vector generator 160 then compares the forward-looking prediction to a second portion of the attack test set to generate an attack test error vector. (Block 675). Using the attack test error vector and the error model parameters $N(\mu,\Sigma)$ determined in connection with block 570 of FIG. 5, the example error vector analyzer 165 calculates a third probability of detecting an anomaly (e.g., an attack). (Block 680). The example anomaly detection controller 120 compares the third probability to the threshold $\tau$ to determine the false positive rate. (Block 690). In some examples, a new value for the threshold $\tau$ may be adjusted if, for example, the false positive rate is greater than an acceptable rate of false positives. In some other examples, the false positive rate is reported to a user and/or administrator of the computer system 100.

Figure 7:
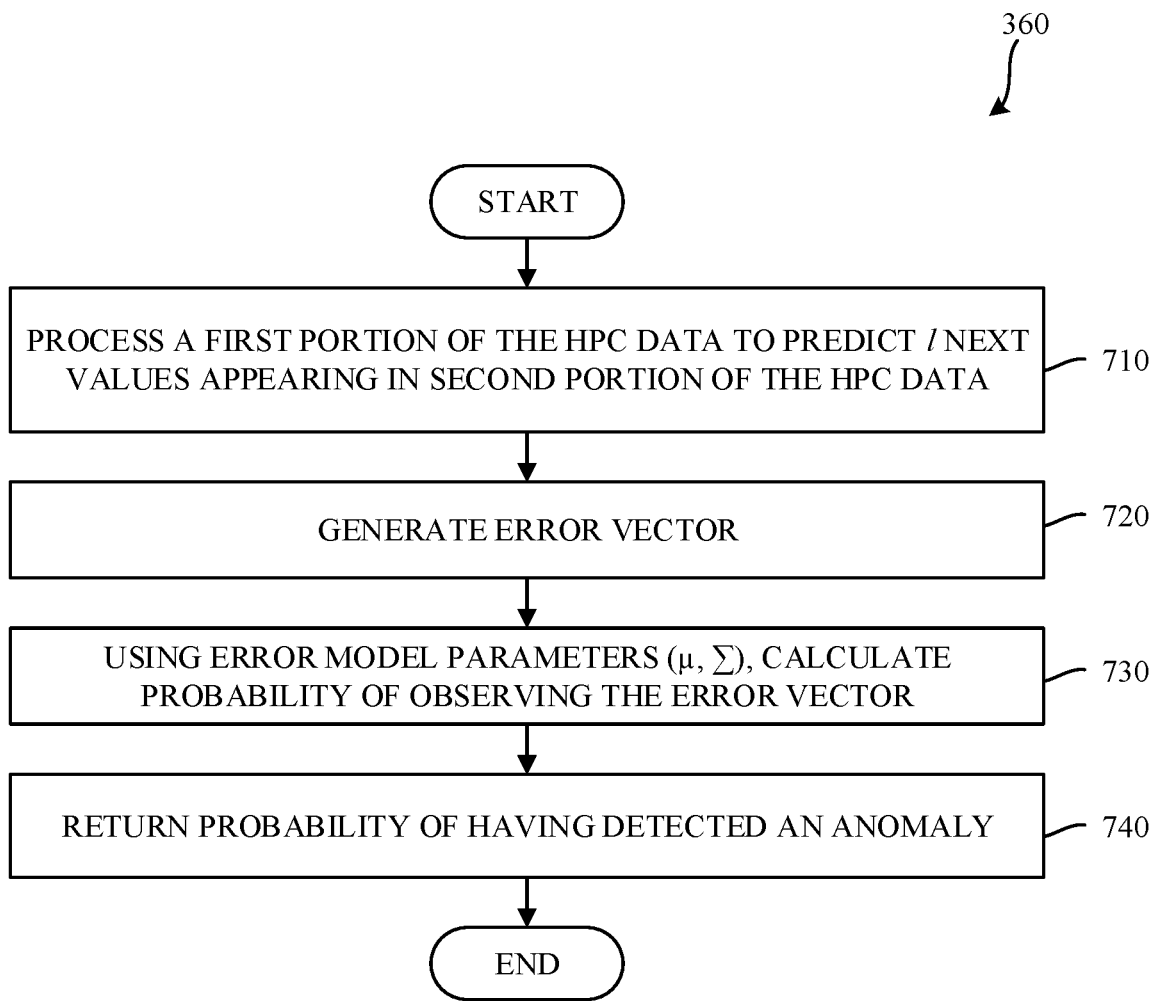
FIG. 7 is a flowchart representative of example machine readable instructions which may be executed to implement the example side channel anomaly detector of FIG. 1 to perform anomaly detection using the machine learning model and anomaly detection threshold against time-series HPC data.

FIG. 7 is a flowchart representative of example machine readable instructions which may be executed to implement the example side channel anomaly detector of FIG. 1 to perform anomaly detection using the machine learning model and anomaly detection threshold against time-series HPC data. The example process 360 of FIG. 7 is performed using captured HPC data gathered in connection with block 310c of FIG. 3. Using the captured HPC data and the machine learning model trained in connection with block 320 of FIG. 3, the example machine learning model processor 145 processes a first portion of the HPC data to predict l next values appearing in the second portion of the HPC data. (Block 710). The example error vector generator 160 generates an error vector $e_t$. (Block 720). The error vector $e_t$ represents the difference between the predicted time-series HPC data and the second portion of the captured time-series HPC data. Using the error model parameters $N(\mu,\Sigma)$ determined in connection with block 570 of FIG. 5, the example error vector analyzer 165 calculates a probability of observing the error vector. (Block 730). The example error vector analyzer 165 returns the probability of having detected an anomaly to the anomaly detection controller 120 (Block 740,) enabling the anomaly detection controller 120 at block 370 of FIG. 3 to determine whether an anomaly has been detected.

Figure 8:
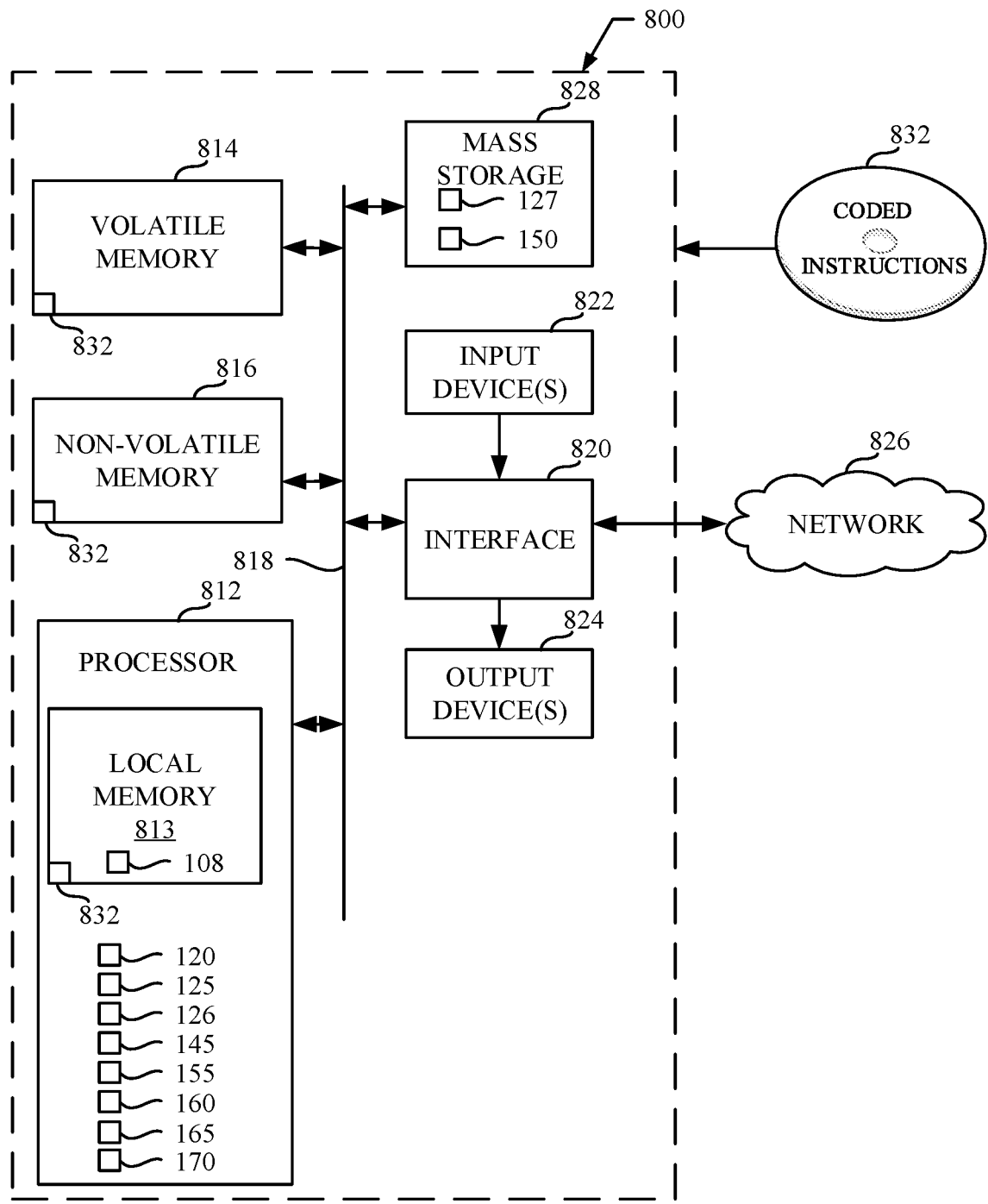
FIG. 8 is a block diagram of an example processing platform structured to execute the instructions of FIGS. 3, 4, 5, 6, and/or 7 to implement the example side channel anomaly detector of FIG. 1.

FIG. 8 is a block diagram of an example processor platform 800 structured to execute the instructions of FIGS. 3, 4, 5, 6, and/or 7 to implement the example side channel anomaly detector 102 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example anomaly detection controller 120, the example HPC interface 125, the example HPC data organizer 126, the example machine learning model processor 145, the example machine learning model trainer 155, the example error vector generator 160, the example error vector analyzer 165, the example threshold determiner 170.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3, 4, 5, 6, and/or 7 may be stored in the mass storage device 828, in the volatile memory 814, in the non-volatile memory 816, and/or on a removable non-transitory computer readable storage medium such as a CD or DVD. In the illustrated example of FIG. 8, the example mass storage device 828 implements the example HPC data datastore 127 and the example machine learning model datastore 150.

From the foregoing, it will be appreciated that example methods, apparatus and articles of manufacture have been disclosed that enable detection of side channel attacks. Some such methods, apparatus and articles of manufacture disclosed herein improve the efficiency of using a computing device by enabling detection of an ongoing side channel attack before a data leak can occur. In this manner, data leaks can be prevented without the need for patching existing systems, applications, and/or hardware, thereby achieving one or more improvement(s) in the functioning of a computer.

Example 1 includes an apparatus for detecting side channel anomalies, the apparatus comprising a hardware performance counter data organizer to collect a first value of a hardware performance counter at a first time and a second value of the hardware performance counter at a second time, a machine learning model processor to apply a machine learning model to predict a third value corresponding to the second time, an error vector generator to generate an error vector representing a difference between the second value and the third value, an error vector analyzer to determine a probability of the error vector indicating an anomaly, and an anomaly detection orchestrator to, in response to the probability satisfying a threshold, cause the performance of a responsive action to mitigate a side channel anomaly.

Example 2 includes the apparatus of example 1, wherein the machine learning model is implemented using a stacked gated recurrent unit architecture.

Example 3 includes the apparatus of example 1, further including a machine learning model trainer to train the machine learning model based on benign hardware performance counter data.

Example 4 includes the apparatus of example 3, wherein the machine learning model trainer does not train the machine learning model based on attack hardware performance counter data.

Example 5 includes the apparatus of example 1, further including a threshold determiner to determine the threshold based on a first probability associated with benign hardware performance data and a second probability associated with attack hardware performance data.

Example 6 includes the apparatus of example 1, wherein the hardware performance counter data organizer is further to impute a fourth value having a timestamp intermediate the first time and the second time.

Example 7 includes the apparatus of example 1, wherein the machine learning model is a first machine learning model, and the responsive action includes utilization of a second machine learning model implemented using a long short-term memory recurrent neural network.

Example 8 includes at least one non-transitory computer-readable medium comprising instructions that, when executed, cause at least one processor to at least collect a first value of a hardware performance counter at a first time and a second value of the hardware performance counter at a second time, apply a machine learning model to predict a third value corresponding to the second time, generate an error vector representing a difference between the second value and the third value, determine a probability of the error vector indicating an anomaly, and cause, in response to determining that the probability satisfying a threshold, performance of a responsive action to mitigate a side channel anomaly.

Example 9 includes the at least one non-transitory computer-readable medium of example 8, wherein the machine learning model is implemented using a stacked gated recurrent unit architecture.

Example 10 includes the at least one non-transitory computer-readable medium of example 8, wherein the instructions, when executed, further cause the at least one processor to train the machine learning model based on benign hardware performance counter data.

Example 11 includes the at least one non-transitory computer-readable medium of example 10, wherein the instructions, when executed, further cause the at least one processor to train the machine learning model without using attack hardware performance counter data.

Example 12 includes the at least one non-transitory computer-readable medium of example 8, wherein the instructions, when executed, further cause the at least one processor to determine the threshold based on a first probability associated with benign hardware performance data and a second probability associated with attack hardware performance data.

Example 13 includes the at least one non-transitory computer-readable medium of example 8, wherein the instructions, when executed, further cause the at least one processor to impute a fourth value having a timestamp intermediate the first time and the second time.

Example 14 includes the at least one non-transitory computer-readable medium of example 8, wherein the machine learning model is a first machine learning model, and the responsive action includes utilization of a second machine learning model implemented using a long short-term memory recurrent neural network.

Example 15 includes an apparatus for detecting side channel anomalies, the apparatus comprising means for collecting a first value of a hardware performance counter at a first time and a second value of the hardware performance counter at a second time, means for predicting a third value corresponding to the second time using a machine learning model, means for generating an error vector representing a difference between the second value and the third value, means for determining a probability of the error vector indicating an anomaly, and means for causing, in response to determining that the probability satisfies a threshold, performance of a responsive action to mitigate a side channel anomaly.

Example 16 includes the apparatus of example 15, wherein the machine learning model is implemented using a stacked gated recurrent unit architecture.

Example 17 includes the apparatus of example 15, further including means for training the machine learning model based on benign hardware performance counter data.

Example 18 includes the apparatus of example 17, wherein the means for training is not to train the machine learning model based on attack hardware performance counter data.

Example 19 includes the apparatus of example 15, further including means for selecting the threshold based on a first probability associated with benign hardware performance data and a second probability associated with attack hardware performance data.

Example 20 includes the apparatus of example 15, wherein the means for collecting is further to impute a fourth value having a timestamp intermediate the first time and the second time.

Example 21 includes the apparatus of example 15, wherein the machine learning model is a first machine learning model, and means for causing is further to cause the use of a second machine learning model implemented using a long short-term memory recurrent neural network.

Example 22 includes a method for detecting side channel anomalies, the method comprising collecting a first value of a hardware performance counter at a first time and a second value of the hardware performance counter at a second time, applying, by executing an instruction with a processor, a machine learning model to predict a third value corresponding to the second time, generating, by executing an instruction with the processor, an error vector representing a difference between the second value and the third value, determining, by executing an instruction with the processor, a probability of the error vector indicating an anomaly, and causing, in response to determining that the probability satisfies a threshold, performance of a responsive action to mitigate a side channel anomaly.

Example 23 includes the method of example 22, wherein the machine learning model is implemented using a stacked gated recurrent unit architecture.

Example 24 includes the method of example 22, further including training the machine learning model based on benign hardware performance counter data.

Example 25 includes the method of example 24, wherein the training of the machine learning model does not utilize attack hardware performance counter data.

Example 26 includes the method of example 22, further including determining the threshold based on a first probability associated with benign hardware performance data and a second probability associated with attack hardware performance data.

Example 27 includes the method of example 22, wherein further including imputing a fourth value having a timestamp intermediate the first time and the second time.

Example 28 includes the method of example 22, wherein the machine learning model is a first machine learning model, and further including utilizing a long short-term memory recurrent neural network to determine whether an anomaly is detected.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for detecting side channel anomalies, the apparatus comprising:
    a hardware performance counter data organizer to collect a first value of a hardware performance counter at a first time and a second value of the hardware performance counter at a second time;
    a machine learning model processor to apply a first machine learning model to predict a third value corresponding to the second time;
    an error vector generator to generate an error vector representing a difference between the second value and the third value;
    an error vector analyzer to determine a probability of the error vector indicating an anomaly; and
    an anomaly detection orchestrator to, in response to the probability satisfying a threshold, cause utilization of a second machine learning model implemented using a long short-term memory recurrent neural network, the utilization of the second machine learning model to enable mitigation of a side channel anomaly.

2. The apparatus of claim 1, wherein the first machine learning model is implemented using a stacked gated recurrent unit architecture.

3. The apparatus of claim 1, further including a machine learning model trainer to train the first machine learning model based on benign hardware performance counter data.

4. The apparatus of claim 3, wherein the machine learning model trainer does not train the first machine learning model based on attack hardware performance counter data.

5. The apparatus of claim 1, further including a threshold determiner to determine the threshold based on a first probability associated with benign hardware performance data and a second probability associated with attack hardware performance data.

6. The apparatus of claim 1, wherein the hardware performance counter data organizer is further to impute a fourth value having a timestamp intermediate the first time and the second time.

7. At least one non-transitory computer-readable medium comprising instructions that, when executed, cause at least one processor to at least:
    collect a first value of a hardware performance counter at a first time and a second value of the hardware performance counter at a second time;
    apply a first machine learning model to predict a third value corresponding to the second time;
    generate an error vector representing a difference between the second value and the third value;

determine a probability of the error vector indicating an anomaly; and cause, in response to determining that the probability satisfies a threshold, utilization of a second machine learning model implemented using a long short-term memory recurrent neural network to mitigate a side channel anomaly.

8. The at least one non-transitory computer-readable medium of claim 7, wherein the first machine learning model is implemented using a stacked gated recurrent unit architecture.

9. The at least one non-transitory computer-readable medium of claim 7, wherein the instructions, when executed, further cause the at least one processor to train the first machine learning model based on benign hardware performance counter data.

10. The at least one non-transitory computer-readable medium of claim 9, wherein the instructions, when executed, further cause the at least one processor to train the first machine learning model without using attack hardware performance counter data.

11. The at least one non-transitory computer-readable medium of claim 7, wherein the instructions, when executed, further cause the at least one processor to determine the threshold based on a first probability associated with benign hardware performance data and a second probability associated with attack hardware performance data.

12. The at least one non-transitory computer-readable medium of claim 7, wherein the instructions, when executed, further cause the at least one processor to impute a fourth value having a timestamp intermediate the first time and the second time.

13. An apparatus for detecting side channel anomalies, the apparatus comprising:
 means for collecting a first value of a hardware performance counter at a first time and a second value of the hardware performance counter at a second time;
 means for predicting a third value corresponding to the second time using a first machine learning model;
 means for generating an error vector representing a difference between the second value and the third value;
 means for determining a probability of the error vector indicating an anomaly; and
 means for causing, in response to determining that the probability satisfies a threshold, use of a second machine learning model implemented using a long short-term memory recurrent neural network to mitigate a side channel anomaly.

14. The apparatus of claim 13, wherein the first machine learning model is implemented using a stacked gated recurrent unit architecture.

15. The apparatus of claim 13, further including means for training the first machine learning model based on benign hardware performance counter data.

16. The apparatus of claim 15, wherein the means for training is to train the first machine learning model without using attack hardware performance counter data.

17. The apparatus of claim 13, further including means for selecting the threshold based on a first probability associated with benign hardware performance data and a second probability associated with attack hardware performance data.

18. The apparatus of claim 13, wherein the means for collecting is further to impute a fourth value having a timestamp intermediate the first time and the second time.

19. A method for detecting side channel anomalies, the method comprising:
 collecting a first value of a hardware performance counter at a first time and a second value of the hardware performance counter at a second time;
 applying, by executing an instruction with a processor, a first machine learning model to predict a third value corresponding to the second time;
 generating, by executing an instruction with the processor, an error vector representing a difference between the second value and the third value;
 determining, by executing an instruction with the processor, a probability of the error vector indicating an anomaly; and
 causing, in response to determining that the probability satisfies a threshold, utilization of a second machine learning model implemented using a long short-term memory recurrent neural network to mitigate a side channel anomaly.

20. The method of claim 19, wherein the first machine learning model is implemented using a stacked gated recurrent unit architecture.

21. The method of claim 19, further including training the first machine learning model based on benign hardware performance counter data.

22. The method of claim 21, wherein the training of the first machine learning model does not utilize attack hardware performance counter data.

23. The method of claim 19, further including determining the threshold based on a first probability associated with benign hardware performance data and a second probability associated with attack hardware performance data.

24. The method of claim 19, wherein further including imputing a fourth value having a timestamp intermediate the first time and the second time.

25. An apparatus for detecting side channel anomalies, the apparatus comprising:
 an interface;
 instructions; and
 at least one processor to execute the instructions to:
  collect a first value of a hardware performance counter at a first time and a second value of the hardware performance counter at a second time;
  apply a first machine learning model to predict a third value corresponding to the second time;
  generate an error vector representing a difference between the second value and the third value;
  determine a probability of the error vector indicating an anomaly; and
  in response to the probability satisfying a threshold, cause utilization of a second machine learning model implemented using a long short-term memory recurrent neural network, the utilization of the second machine learning model to enable mitigation of a side channel anomaly.

26. The apparatus of claim 25, wherein the first machine learning model is implemented using a stacked gated recurrent unit architecture.

27. The apparatus of claim 25, wherein the at least one processor is to train the first machine learning model based on benign hardware performance counter data.

28. The apparatus of claim 27, wherein the at least one processor does not train the first machine learning model based on attack hardware performance counter data.

29. The apparatus of claim 25, wherein the at least one processor is to determine the threshold based on a first probability associated with benign hardware performance data and a second probability associated with attack hardware performance data.

30. The apparatus of claim 25, wherein the at least one processor is further to impute a fourth value having a timestamp intermediate the first time and the second time.

* * * * *